US012588595B2

(12) United States Patent
Engels et al.

(10) Patent No.: US 12,588,595 B2
(45) Date of Patent: Mar. 31, 2026

(54) HARVESTING MACHINE FOR HARVESTING ELONGATED PLANTS AS WELL AS A METHOD FOR HARVESTING ELONGATED PLANTS

(71) Applicant: ENGELS FAMILIE HOLDING B.V., Panningen (NL)

(72) Inventors: Franciscus Maria Engels, Panningen (NL); Marcus Franciscus Engels, Panningen (NL); Christiaan Michiel Engels, Panningen (NL)

(73) Assignee: ENGELS FAMILIE HOLDING B.V., Panningen (NL)

( * ) Notice: Subject to any disclaimer, the term of this patent is extended or adjusted under 35 U.S.C. 154(b) by 348 days.

(21) Appl. No.: 18/257,406

(22) PCT Filed: Dec. 9, 2021

(86) PCT No.: PCT/NL2021/050752
§ 371 (c)(1),
(2) Date: Jun. 14, 2023

(87) PCT Pub. No.: WO2022/131907
PCT Pub. Date: Jun. 23, 2022

(65) Prior Publication Data
US 2024/0099195 A1    Mar. 28, 2024

(30) Foreign Application Priority Data
Dec. 17, 2020    (NL) ..................................... 2027135

(51) Int. Cl.
A01D 45/00      (2018.01)
A01D 57/20      (2006.01)
A01D 57/22      (2006.01)

(52) U.S. Cl.
CPC ........... *A01D 45/007* (2013.01); *A01D 57/20* (2013.01); *A01D 57/22* (2013.01)

(58) Field of Classification Search
CPC ....... A01D 45/007; A01D 57/20; A01D 57/22
See application file for complete search history.

(56) References Cited

U.S. PATENT DOCUMENTS 1,650,521 A * 11/1927 Johnson ............... A01D 45/003
                                                              56/59
3,447,292 A *  6/1969 Rehmke ............... A01D 45/007
                                                              56/327.2
(Continued)

FOREIGN PATENT DOCUMENTS

EP          3824715 A2      5/2021
JP       H06-178608 A       6/1994
WO    WO-2017111586 A1 *    6/2017    ............. A01D 45/00

OTHER PUBLICATIONS

Patent Cooperation Treaty, International Search Report, Application No. PCT/NL2021/050752, dated Mar. 3, 2022, in 3 pages.

*Primary Examiner* — Joseph M Rocca
*Assistant Examiner* — Julia C Tran
(74) *Attorney, Agent, or Firm* — Procopio, Cory, Hargreaves & Savitch LLP

(57) ABSTRACT

The invention relates to a harvesting machine for harvesting elongated plants, for example such as green asparagus, wherein the harvesting machine, moving in a direction of travel, is provided with at least one in-feed device with which a plant is to be fed into the harvesting machine, at least one gripping device following the in-feed device with which the plant fed in is to be gripped, as well as at least one separating device with which a part of the gripped plant to be harvested is to be separated from another part of the plant.

15 Claims, 5 Drawing Sheets

(56) References Cited

U.S. PATENT DOCUMENTS

Figures 1A, 1B:
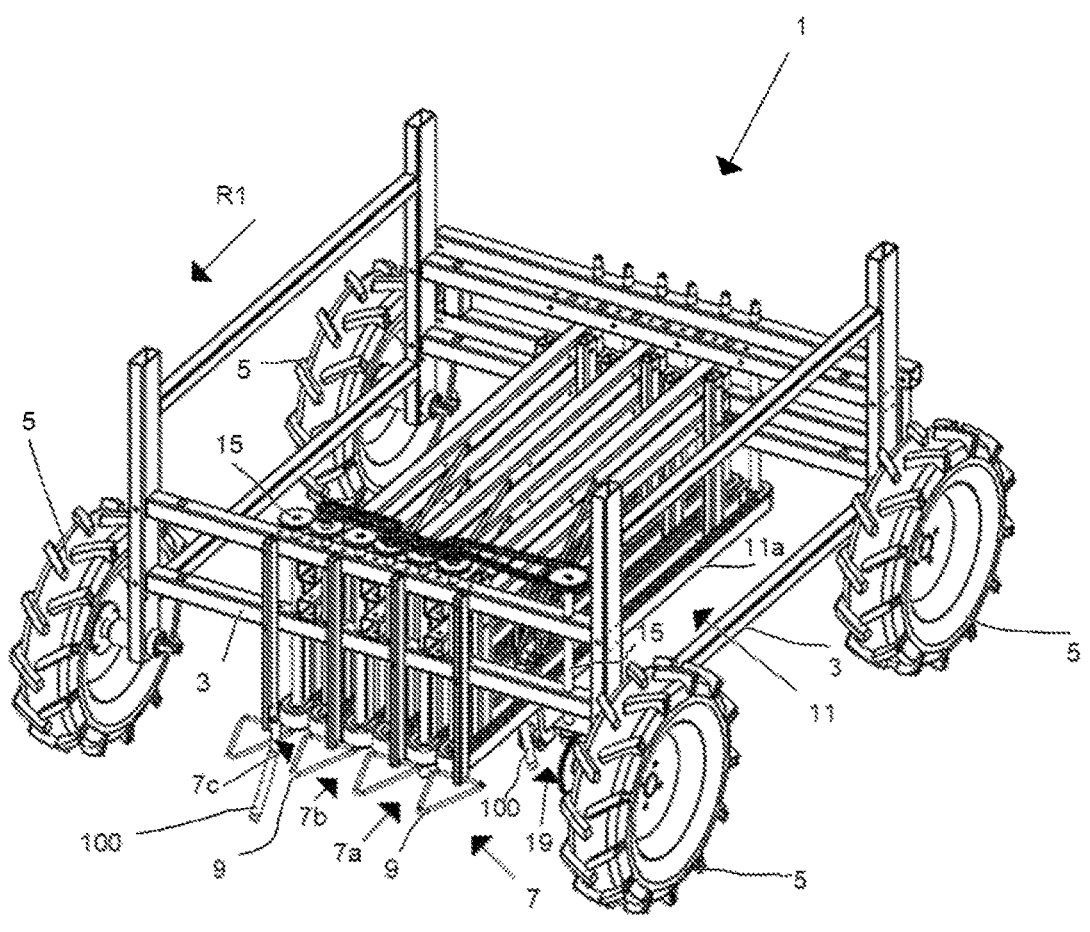

| 3,636,687 | A | * | 1/1972 | McKissick | ........... | A01D 45/007 |
| | | | | | | 56/327.2 |
| 4,059,943 | A | * | 11/1977 | Peasley | ................ | A01D 45/007 |
| | | | | | | 56/327.2 |
| 4,480,430 | A | * | 11/1984 | Wahls | .................. | A01D 45/007 |
| | | | | | | 56/327.2 |
| 4,512,145 | A | | 4/1985 | Lund | | |
| 4,918,909 | A | | 4/1990 | Salkeld | | |
| 10,993,372 | B1 | * | 5/2021 | Lund | ................... | A01D 45/007 |

* cited by examiner

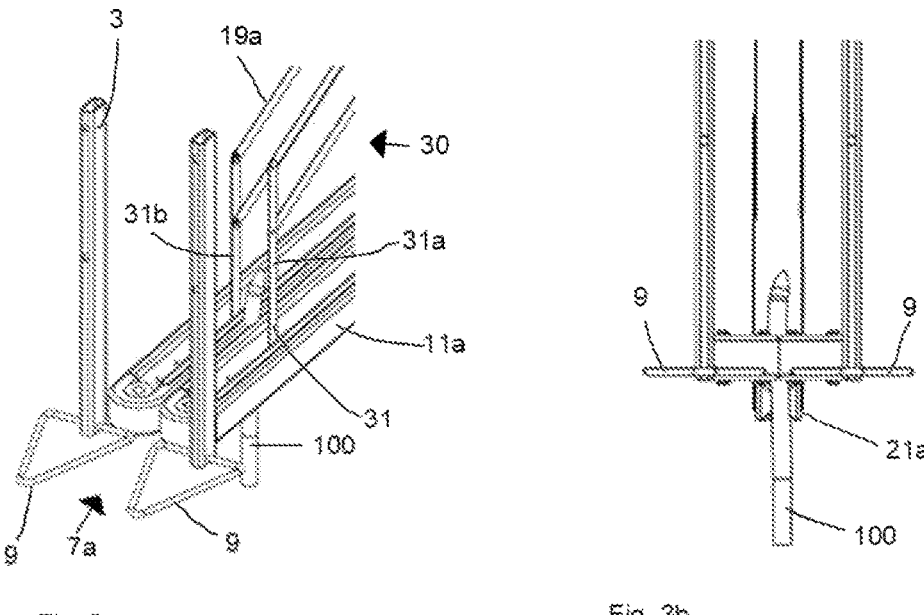
Fig. 3a
Fig. 3b
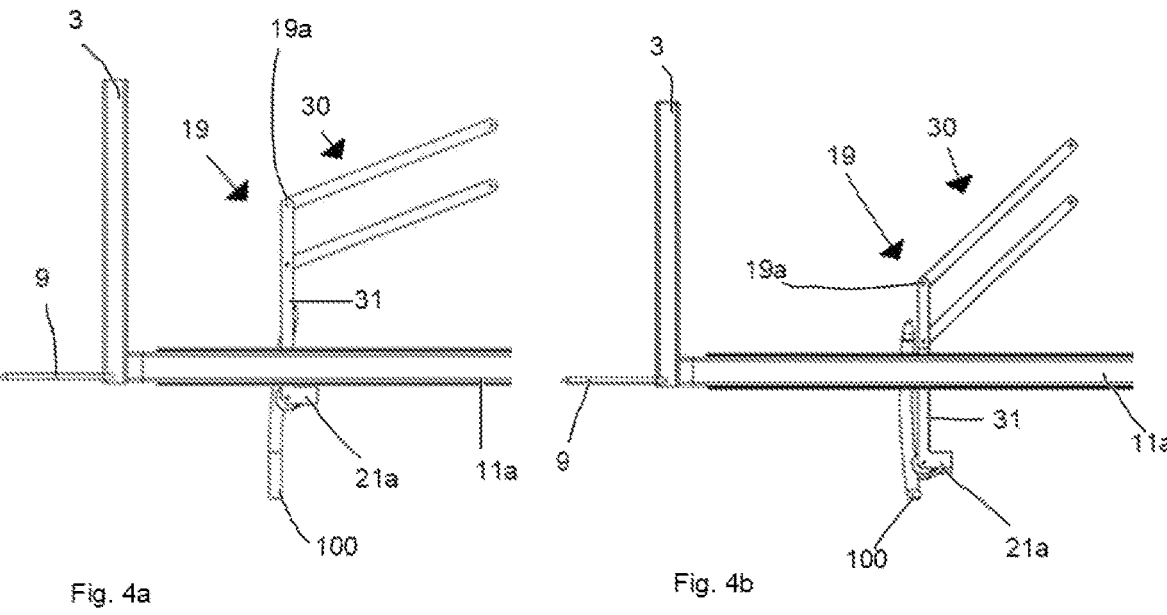
Fig. 4a
Fig. 4b

HARVESTING MACHINE FOR HARVESTING ELONGATED PLANTS AS WELL AS A METHOD FOR HARVESTING ELONGATED PLANTS

CROSS-REFERENCE TO RELATED APPLICATIONS

This application is US National Stage of International Patent Application PCT/NL2021/050752, filed Dec. 9, 2021, which claims benefit of priority from Dutch Patent Application NL2027135, filed Dec. 17, 2020, the contents of both of which are incorporated herein by reference.

The invention relates to a harvesting machine for harvesting elongated plants, for example such as green asparagus, wherein the harvesting machine, moveable in a direction of travel, is provided with at least one in-feed device with which a plant is to be fed into the harvesting machine, at least one gripping device following the in-feed device with which the plant fed in is to be gripped, as well as at least one separating device with which a part of the gripped plant to be harvested is to be separated from another part of the plant.

The invention further relates to a method for harvesting elongated plants, for example such as green asparagus.

The invention also relates to the use of a harvesting machine described in this document for harvesting plants.

A harvesting machine for green asparagus is known from U.S. Pat. No. 4,918,909. The harvesting machine comprises feed tines for feeding-in green asparagus between conveyor belts of the harvesting machine, wherein the green asparagus to be harvested is gripped between the conveyor belts. The harvesting machine further comprises a separating device with a cutting mechanism. The cutting mechanism is activated after detecting a gripped green asparagus with detecting means such as a microswitch. Said detecting means lead relatively often to incorrect detection so that the separating device does not operate optimally, so that the cutting mechanism is not activated or is activated at the wrong time. In particular, conditions in the field, for example such as mud and/or weather conditions may dramatically increase the number of cutting operations carried out in error owing to wrong detection by the detecting means.

One object of the present invention is to provide an improved harvesting machine. An additional object of the present harvesting machine is to reduce the number of cutting operations carried out incorrectly on a gripped plant.

At least one of these objects is achieved by means of a harvesting machine as defined in claim 1.

The harvesting machine is a machine for harvesting elongated plants, for example such as green asparagus. The harvesting machine that is movable in a direction of travel over the land is provided with at least one in-feed device with which at least one plant is to be fed into the harvesting machine, at least one gripping device following the in-feed device with which the plant fed in is to be gripped, as well as at least one separating device with which a part of the gripped plant to be harvested is to be separated from another part of the plant. The separating device is provided with at least one roller comprising a cutting mechanism, the roller is movable along the gripped plant over a length of the plant between a starting position and an end position in which the part of the gripped plant to be harvested is to be separated by means of the cutting mechanism from the other part of the plant.

The advantage of such a harvesting machine is that plants, in particular green asparagus, can be harvested in an effective and improved manner with this machine. This machine is designed to reduce the work and activities required for harvesting plants, briefly to work more efficiently. Through the configuration of the separating device, a gripped plant is harvested in a consistent manner so that there are no or in any case relatively few incorrect cutting operations by the harvesting machine. The selecting or feeding-in, clamping and cutting-off of the plants can be carried out, by means of the harvesting machine described above, automatically and with relatively high reliability. Moreover, for example no detecting means are required for starting the cutting-off or cutting of the plant, merely the roller reaching the end position is sufficient for carrying out the cutting-off operation by means of the cutting mechanism. The gripping device may be configured as a clamping belt, i.e. two endless conveyor belts, between which the plant is to be clamped and gripped. At the front of the clamping belt, an in-feed device is mounted, which ensures that each elongated plant with a certain height measured from the land is moved by the forward movement of the harvesting machine in the direction of travel to the entrance of the gripping device, for example the clamping belt. As soon as the plant gripped by means of the gripping device comes into contact with the separating device, a roller of the separating device and the cutting mechanism of the separating device can be moved along the elongated plant between a starting position and an end position. When the end position is reached, activation of the cutting mechanism can take place to separate the part of the gripped plant to be harvested from the other part of the plant or the cutting operation may be carried out by means of the cutting mechanism in some other way. Moving the roller along the gripped plant ensures that the plant that has been fed in and gripped is cut off by means of the cutting mechanism at the moment the roller reaches the end position. In this way, the harvesting machine does not need a detecting means such as a microswitch, while the harvesting efficiency of the harvesting machine can be increased regardless of the conditions in the field. The desired end position is for example to be set beforehand, to set a minimum length of the part of each plant to be harvested.

In one aspect of the harvesting machine, through the movement of the harvesting machine in the direction of travel, the roller can be brought into contact with the gripped plant automatically. This is possible for example by aligning the gripping device in such a way that the position of the gripped plant can be kept substantially constant while the harvesting machine moves in the direction of travel. Through the movement of the harvesting machine in the direction of travel, also including the separating device attached to the harvesting machine, particularly the roller thereof, by means of the roller, at a certain moment owing to the movement in the direction of travel relative to the gripped plant, the separating device comes into contact with the plant. Through this contact, the roller may be activated automatically by the separating device to move to the end position. A gripping device may for example be a clamping belt, which is driven to move a plant opposite to the movement of the harvesting machine in the direction of travel, so that the position of the gripped plant can be kept almost constant owing to the opposite movements, i.e. despite the fact that the harvesting machine moves in the direction of travel, the gripped plant is not moved, or is only moved minimally, by means of the driven gripping device.

In another aspect of the harvesting machine, the separating device is configured to convert automatically the direction of travel extending substantially parallel to the land into a movement of the roller directed substantially towards the land from the starting position to the end position. In this embodiment the roller does not need its own drive in order to move between the starting point and the end point, so that the harvesting machine can be made relatively easily with relatively few components. In this way, a reliable and robust harvesting machine can be supplied, with a relatively long life. The direction of travel extending substantially parallel to the land is converted automatically after the roller comes into contact with the gripped plant into a movement of the roller directed towards the land, from the starting position to the end position. The automatic conversion can be executed entirely mechanically by providing the separating device with a hinged construction, for example with a parallelogram linkage, with which the roller is connected to the harvesting machine for converting a direction of movement normally extending substantially in a horizontal direction into a movement of the roller in a substantially vertical direction.

In a further aspect of the harvesting machine, the separating device is provided with a return mechanism, for example a spring mechanism for moving the roller from the end position to the starting position after separating the part to be harvested. By means of the return mechanism, the roller is brought back to the starting position automatically and the roller is also held there if no contact has been or is made with a gripped plant. After the plant has been cut off, the roller is no longer subject to any back pressure from the plant growing on the land, the part of the plant to be harvested has been separated from the rest of the plant, wherein the rest of the plant may be formed by the underground roots of the plant but also by other aerial parts of the plant.

In yet another aspect of the harvesting machine, the roller comprises a roll in the form of a diabolo that is to be positioned against the plant in order to move the roller along the gripped plant between the starting and the end position. The diabolo roll ensures that on contact with the plant, the plant is moved to the middle of the roll between the two bowl-shaped diabolo parts and is held there by the diabolo shape so that correct orientation of the gripped plant relative to the roller movable thereon is and remains assured.

A further object of the present invention is to provide a method with which the harvesting of plants can be improved and/or optimized. An additional object of the method is to minimize the number of cutting operations carried out incorrectly on a gripped plant.

At least one of these objects is achieved by means of a method as defined in an appended independent method claim.

The method for harvesting elongated plants, for example such as green asparagus, by means of a harvesting machine comprises the following steps: a plant is fed into the harvesting machine moving in a direction of travel over the land, in the harvesting machine the plant is gripped, and a part of the gripped plant to be harvested is separated from another part of the plant by means of a separating device that is provided with at least one roller comprising a cutting mechanism, the roller is moved along the gripped plant over a length of the plant between a starting position and an end position in which the part of the gripped plant to be harvested is separated from the other part of the plant by means of the cutting mechanism. The advantage of such a method is that plants, in particular green asparagus, can be harvested in an effective and improved manner by this method. Moreover, by means of the method, the harvesting process can be carried out in a relatively optimum and efficient manner. By moving the roller along the plant to be harvested, it is reliably ensured that each plant fed in and gripped is cut off by means of the cutting mechanism at the moment the roller reaches the end position. In this way incorrect cutting operations are avoided or in any case greatly reduced.

In one aspect of the method, through the movement of the harvesting machine in the direction of travel, the roller is automatically brought into contact with the gripped plant. Furthermore, the direction of travel extending substantially parallel to the land can be converted automatically into a movement of the roller substantially directed towards the land from the starting position to the end position. Moreover, after separating the part to be harvested, the roller can be moved automatically from the end position to the starting position. To avoid unnecessary repetitions, for the advantages of this method, reference should be made to the advantages of the harvesting machine already mentioned above.

The aspects described above will be explained hereunder based on an embodiment example in combination with the figures. However, the invention is not limited to the embodiment examples described hereunder. Rather, a number of variants and modifications are possible, which also make use of the idea of the invention and consequently fall within the scope of protection. In particular, the possibility is mentioned of combining the features/aspects that are only mentioned in the description and/or are shown in the figures with the feature presented in the claims in so far as compatible.

Figure 2A:
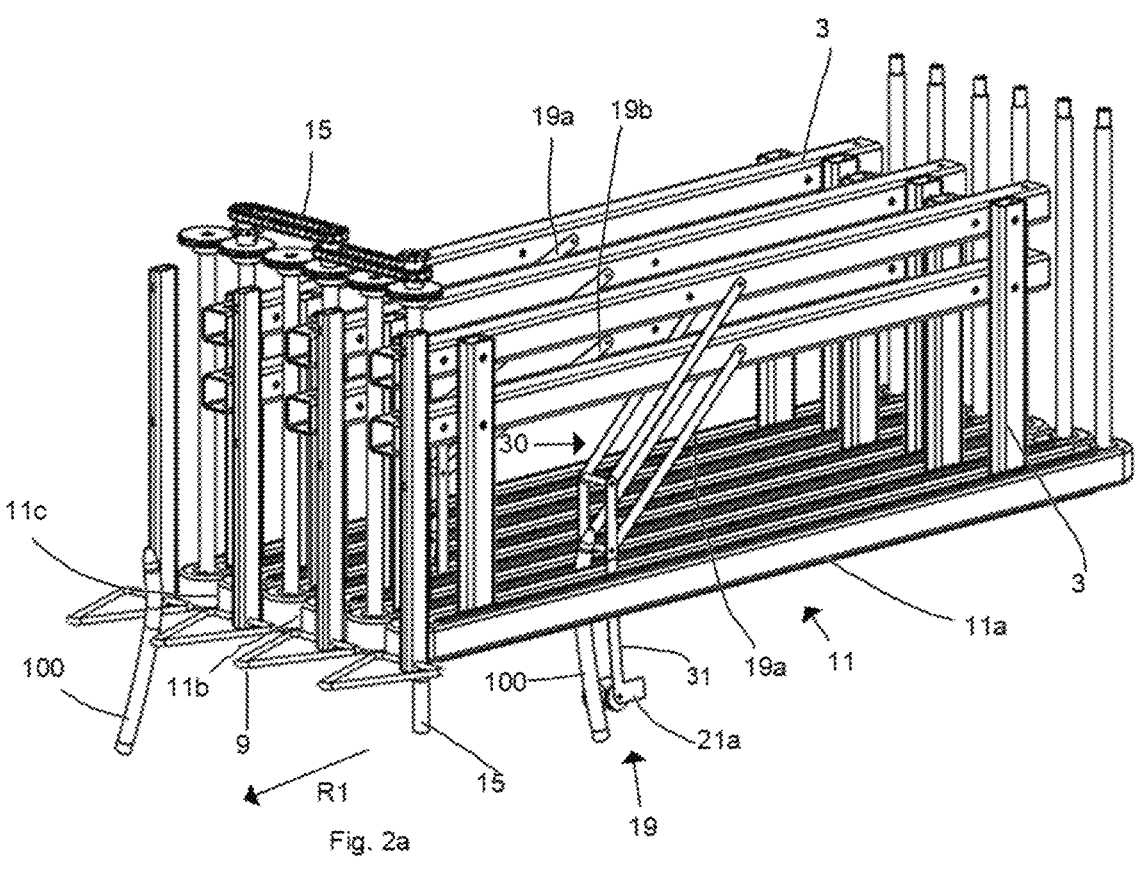
Figure 2B:
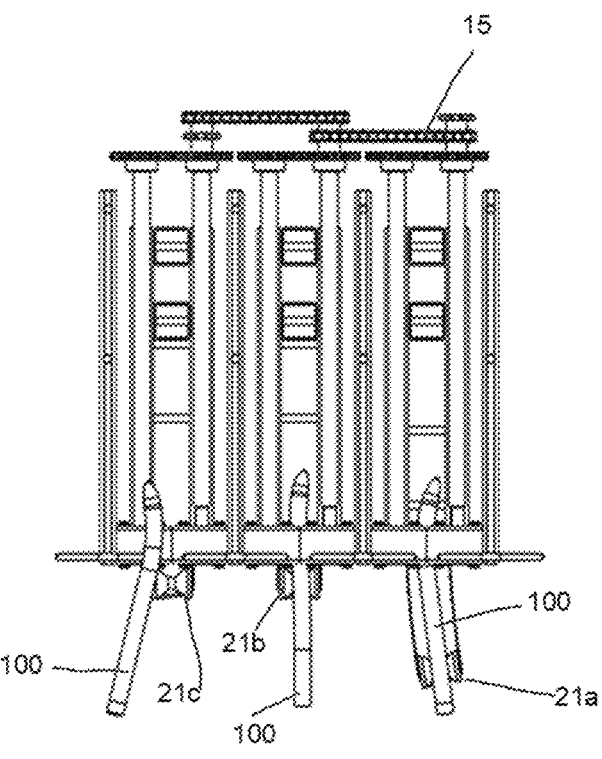
Figure 5:
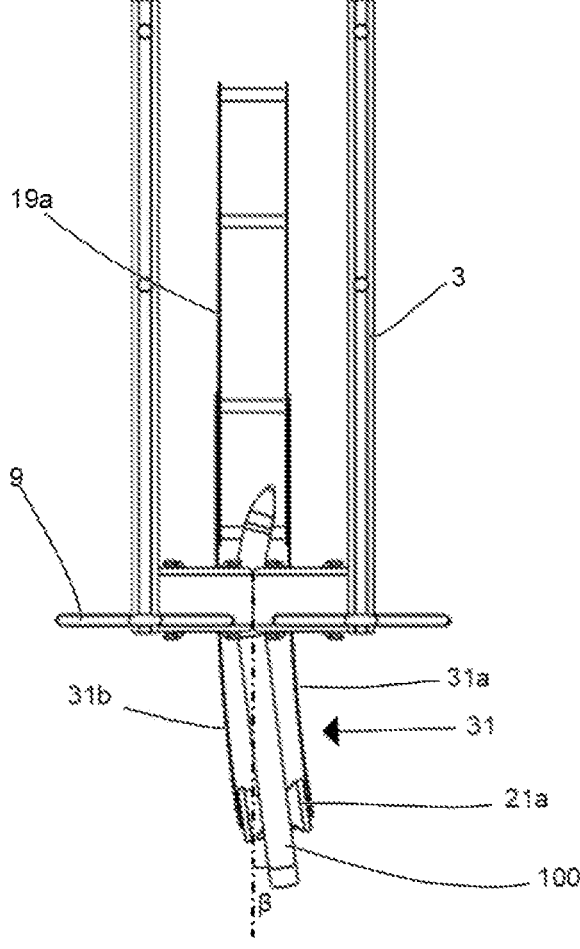

Reference is made to the following figures, in which:

FIG. 1a,b show schematically components of a harvesting machine;

FIG. 2a,b show schematically a perspective view, and a front view of a number of components of the harvesting machine;

FIG. 3a,b show different views of a number of components of the harvesting machine without a number of the components of the harvesting machine shown in FIGS. 1a-2b;

FIG. 4a,b show side views of the components shown in FIG. 3a,b;

FIG. 5 shows a view of the components shown in FIG. 3a,b with an asparagus fed in relatively obliquely.

Figures 6A, 6B:
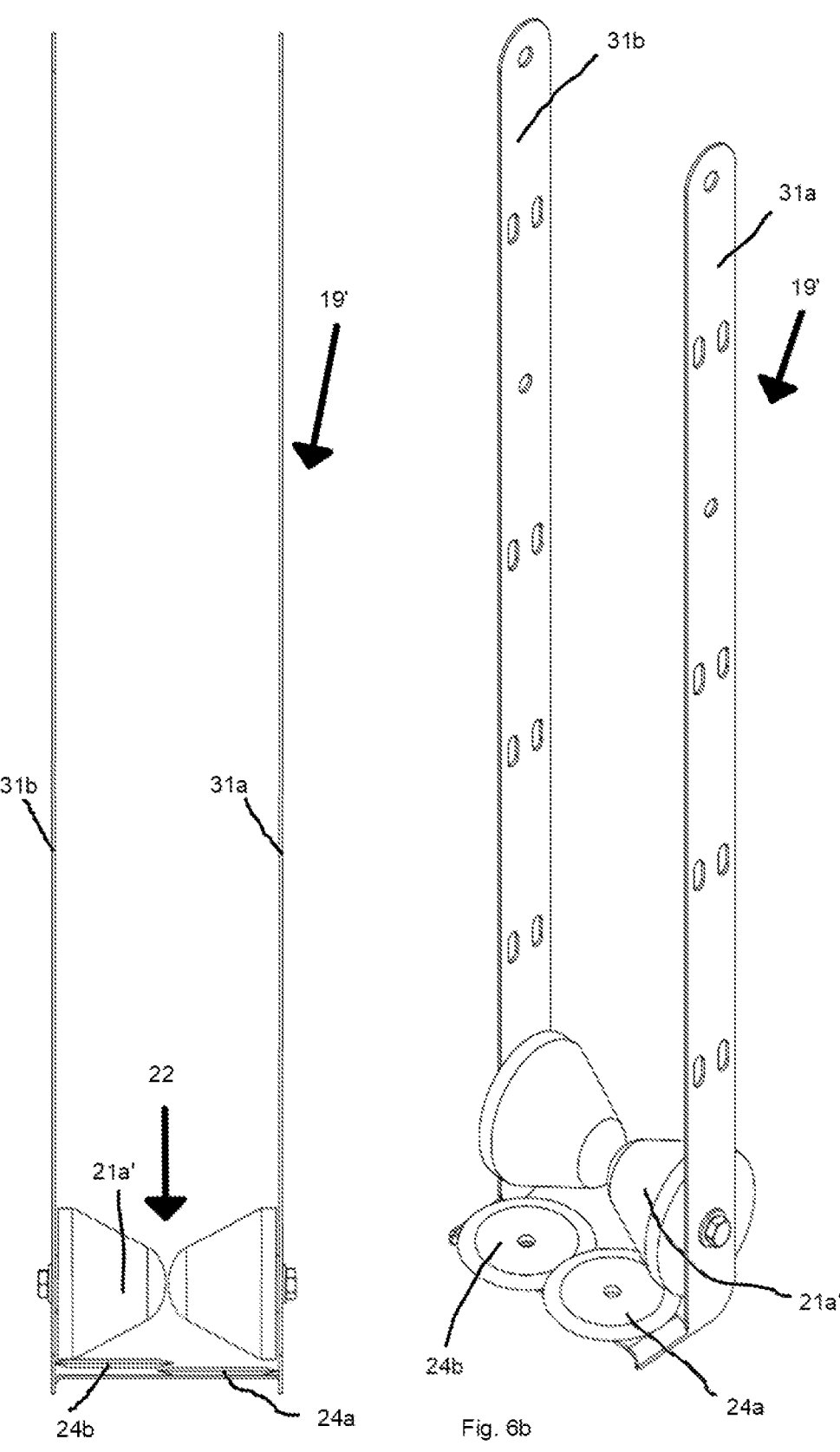

FIG. 6a,b show an alternative embodiment of the separating device.

In the figures, identical components are given the same reference signs.

The components of the harvesting machine 1 for harvesting elongated plants shown in the figures are explained hereunder on the basis of the harvesting of green asparagus. However, the harvesting machine 1 described in this document is not limited to the harvesting of green asparagus.

The asparagus plant is suitable for a perennial crop. In spring, asparagus stems grow upwards one by one from the crown of the plant. When a stem projects 20-30 cm, for example about 25 cm, above the ground, the ideal harvesting length is obtained. The stem is then cut off near the surface of the ground. It is important that no other stems growing nearby are damaged during cutting off. Multiple asparagus plants stand in a row one after another. An entire plot is filled by planting several rows next to each other. A certain distance is necessary between the rows for cultivation aspects; the distance between the rows may also be used for carrying out harvesting activities.

The components of the harvesting machine 1 shown in FIG. 1a,b comprise a frame 3 that is movable in a driven manner by means of wheels 5 over the land/asparagus field in a direction of travel R1 for harvesting green asparagus 100. In operation, said wheels 5 are positioned between the rows of asparagus plants in order to move the harvesting machine in the direction of travel R1 to harvest green asparagus. The drive for moving the harvesting machine in the direction of travel R1 is not shown in the figures.

In FIGS. 2a-5, certain components of the harvesting machine 1 shown in FIG. 1a,b are shown in more detail or with fewer components of the harvesting machine 1. The harvesting machine 1, movable over the land in a direction of travel R1, is provided with at least one in-feed device 7. The in-feed device 7 shown comprises three feed channels 7a, 7b, 7c. Each funnel-shaped feed channel is formed by two triangular-shaped feed elements 9, which ensure that asparagus stems of a certain height are fed into the machine 1 by the forward motion in the direction of travel R1 of the machine 1. In total, the machine 1 comprises four feed elements 9 for forming three feed channels 7a, 7b, 7c. With the machine 1 shown it is consequently possible to harvest three green asparagus plants almost simultaneously. The harvesting machine further comprises at least one gripping device 11 following the in-feed device 9, with which the fed-in asparagus plants are gripped. The gripping device 11 comprises three identically configured clamping belts 11a, 11 b, 11c located next to each other. Each clamping belt comprises two driven endless conveyor belts, between which the plant is to be clamped and gripped. Through the movement of the machine 1 in the direction of travel R, an asparagus 100 still joined to the plant is moved by means of one of the formed feed channels 7a, 7b, 7c towards one of the entrances of the clamping belts 11a, 11 b, 11c. FIG. 1b shows how an asparagus 100 is fed into the machine 1 and is gripped by means of the clamping belt 11a. The conveyor belts of the clamping belts 11a, 11 b, 11c are driven by means of a transfer mechanism 15 connected to an axle of a wheel 5. As a result, it is possible to rotate the conveyor belts of the clamping belts 11a, 11 b, 11c (FIG. 2a) in such a way that an asparagus gripped by means of a clamping belt is moved opposite to the movement of the harvesting machine in the direction of travel R1, so that despite movement of the machine 1 in the direction of travel 1, the gripped asparagus 100 can be gripped in the same position relative to the asparagus plant. In other words, the gripping device 11 is to be directed in such a way that the position of the gripped asparagus can be kept substantially constant relative to an asparagus plant from which a gripped green asparagus will be harvested by means of the harvesting machine 1, while the harvesting machine 1 itself moves in the direction of travel R1. The machine 1 further comprises a separating device 19. The separating device 19 comprises three identically configured separation mechanisms 19a, 19b, 19c in the machine 1, wherein each separation mechanism belongs to one of the three identically configured clamping belts 11a, 11 b, 11c. By means of the separating device 19, a part of the gripped plant to be harvested, the green asparagus (hereinafter asparagus), is to be separated from another part of the plant, the rest of the asparagus plant. Each separation mechanism 19a, 19b, 19c of the separating device 19 is provided with a cutting mechanism comprising roller 21a, 21b, 21c that is movable along the gripped asparagus 100 over a predetermined length of the asparagus between a starting position, see for example roller 21b in FIG. 1b or 2b, or roller 21a in FIG. 3b or 4a, and an end position, see for example roller 21a in FIG. 1b, 2b, 4b or 5. In the end position of the roller, for example activation of the cutting mechanism takes place, to cut off and harvest the gripped asparagus. Each clamping belt may be configured as the clamping belt 11a as shown in FIG. 1b, although this is not shown in the figures. The clamping belt 11a is provided with two sections 11a', 11a". A section 11a' of the clamping belt 11a of the gripping device 11 directly following the in-feed device 7 extends substantially parallel to the land, i.e. normally substantially horizontally as represented by the virtual dotted line 125. A second section 11a" of the clamping belt 11a of the gripping device 11 forms an acute angle α with the land or the horizontal line 125 as shown in FIG. 1b. For example an angle α between 10 and 45 degrees. By means of the second section 11a" of the clamping belt 11a, the asparagus 100' cut away from the plant (the prime indicates an asparagus cut away from the plant) is moved upwards relative to the land so that space arises to allow the harvested asparagus 100' to drop into a collecting bin 150 or similar at the end of the clamping belt. The section 11a' directly following the in-feed device 7 is located between the second section 11a" and the in-feed device 7. In an alternative configuration of the machine that is not shown, the separating device may also be mounted closer to or even directly after the in-feed device. The clamping belt (not shown) may be configured as a clamping belt positioned at an angle, instead of the section 11a' shown extending substantially parallel to the land and the section 11a" positioned at an acute angle α. The angle of the clamping belt, which is not shown, is a constant acute angle and for example is between 10 and 30 degrees. By means of the clamping belt positioned at an angle, the asparagus can be pulled upwards or can be straightened by means of the gripping device, which may contribute to an improved cutting operation by means of the cutting mechanism. Through the movement of the harvesting machine 1 in the direction of travel R1, the gripped asparagus 100 is moved relative to the frame 3, as well as relative to the collecting bin 150 attached directly or indirectly to the frame 3 and the separating device 19 attached to the frame 3, despite the driven conveyor belts of the clamping belt to keep the position of the asparagus 100 relative to the rest of the asparagus plant (not shown) almost constant. Consequently, through the movement of the harvesting machine 1 in the direction of travel, the roller 21a,21b,21c of the separating device 19 can be brought automatically into contact with the asparagus 100 gripped by the clamping belts 11a,11b,11c. Each separation mechanism 19a,19b,19c of the separating device is configured to convert the direction of travel extending substantially parallel to the land R1 automatically into a movement P1 of the roller directed substantially towards the land from the starting position to the end position of the roller 21a,b,c. In the embodiment example shown, the separation mechanism 19a,b,c is provided with a hinge construction 30, with which the roller 21a,b,c is connected to the frame 3 of the harvesting machine 1. On an underside of each clamping belt 11a,b,c there is an undriven roll of the roller 21a,b,c, which is connected to the frame 3 of the harvesting machine 1 by means of the hinge construction 30 and consequently on movement of the harvesting machine 1 in the direction indicated by arrow R1 is moved along relative to the asparagus 100 in the direction indicated by arrow R1. Said position directly on the underside is the aforementioned starting position of the roller 21a,b,c. The roll of the roller 21a,b,c is a diabolo roll and the roller 21a is attached to a freely movable swivelling arm 31 (see FIG. 4a). The swivelling arm 31 comprises two rods/strips 31a, 31b extending parallel (FIG. 3a), which are connected to one another (FIG. 2a). The swivelling arm 31, with a number of other rods, is a component of a system of rods that operates as a four-rod parallelogram mechanism. With a return mechanism (not shown), for example a spring mechanism between the hinge construction 30 and the frame 3, the roller is kept or brought to the starting position after a green asparagus 100' is cut off from the asparagus plant. The cutting mechanism in the form of a driven knife is mounted near the roll of the roller 21*a,b,c*, on the underside, and after reaching the end position of the roller this can automatically execute a cutting motion in the direction of travel R1 of the machine 1 to cut off the asparagus 100. As soon as an asparagus stem 100 is clamped by the clamping belt 11*a,b,c* and is gripped, while the machine 1 continues to move in the direction of travel R1, at a certain moment the roller 21*a,b,c* comes into contact with the asparagus stem 100. After contact, the roller 21*a,b,c* moves as a result of the movement in the direction of travel relative to the asparagus gripped above the asparagus plant by means of the hinge construction 30 in the direction towards the ground indicated by arrow P1. As shown in FIG. 5, the swivelling arm 31 is freely movable, so that the roll 21*a* of the roller can follow a relatively crooked (see angle β in FIG. 5) asparagus stem in the direction of travel of the machine without any problem. In other words, the hinge construction is configured to follow the gripped asparagus 100 in a flexible manner by means of the roller 21*a* between the starting and end position. The asparagus stem 100, as shown in FIG. 5, which is gripped by the clamping belt 11*a*, extends downwards not perpendicularly towards the land (see angle β in FIG. 5). For this purpose, the swivelling arm 31 of the hinge construction is configured to be flexible, for example by making the swivelling arm from a flexible material such as spring steel and/or with hinged connection with clearance to the other rods/arms of the hinge construction. After the asparagus 100' has been cut off, the roller 21*a,b,c* is moved on by the machine 1 and the cut-off asparagus 100', still gripped by the clamping belt, remains in the original position relative to the asparagus plant (not shown). By means of the return mechanism (not shown), the hinge construction 30 and the roller 21*a* connected thereto are to be moved in the direction of the clamping belt 11*a* back to the starting position. In this way, the roller consequently moves between the cut surfaces of the cut-off asparagus stem 100' and the plant. The cut-off asparagus 100' is still gripped by the clamping belt, as already mentioned above.

An alternative embodiment of the separating device 19' is shown in FIG. 6*a,b*. The roller 21*a'* comprises two conical halves, between which there is an opening 22. The conical halves of the roller 21*a'* are for example made of a flexible material. The size of the opening 22 and/or the flexible material of the conical halves are selected in such a way that the plant, hereinafter briefly an asparagus stem, cannot move by itself through the opening. In other words, the opening is relatively small, for example about 0.1-1.0 cm. If the roller 21*a'* meets the asparagus stem in the starting position, the force/pressure that is exerted on the roller 21*a'* is relatively low, so that the roller 21*a'* as described in this document can roll down. After the roller 21*a'* moves from the starting position, the force/pressure on the asparagus stem increases progressively until, at the moment of reaching the end position of the roller 21*a'* and the cutting mechanism, the asparagus stem is moved by the built-up force/pressure through the opening 22 and is cut by the cutting mechanism installed behind it. The force exerted by the roller 21*a'* on the asparagus stem increases progressively between the starting position and the end position as a result of the return mechanism, in particular a spring mechanism. The cutting mechanism shown in FIG. 6*a,b* comprises two oppositely rotating cutting blades 24*a,b*. These cutting blades 24*a,b* may for example be driven via a flexible drive shaft by a motor (not shown), which may be located elsewhere in the machine. The cutting blades 24*a,b* may be driven continuously or the drive may be started automatically for each cutting operation, for example by an asparagus stem in the starting position or on reaching a predetermined point located on the path formed by the starting position and the end position. The cutting blades 24*a,b* are positioned directly behind the roller 21*a'*, wherein an asparagus stem that moves through the opening 22 is cut through automatically by means of the cutting blades 24*a,b*. As soon as the asparagus stem has been cut through, the cut-off asparagus stem is moved backwards by means of the rotating cutting blades 24*a,b*. The roller 21*a'* with the cutting mechanism comprising the cutting blades 24*a,b* will or can then be moved back to the starting position by means of the return mechanism.

The height of the in-feed device 9 and therefore the height of the gripping device are to be set in such a way that only plants with a minimum height will be fed into the harvesting machine. In this way, no elongated plants are harvested that do not yet have the desired length (length/height). Adjusting means may be provided on the frame 3 for setting the height of the in-feed device and of the gripping device relative to the land.

Although the harvesting machine shown is provided with three different feed channels mounted next to each other, clamping belts and separation mechanisms, it is of course possible to provide the harvesting machine (not shown) with only a single feed channel formed by two feed elements, with only a single clamping belt as well as with only a single separation mechanism. Of course, other numbers are also possible, so that with a harvesting machine (not shown) for example 2, 4 or more asparagus spears can be harvested simultaneously.

The invention claimed is:

1. A harvesting machine for harvesting elongated plants, including green asparagus, wherein the harvesting machine movable in a direction of travel over a land is provided with at least one in-feed device with which at least one plant is to be fed into the harvesting machine, at least one gripping device following the in-feed device with which the plant fed in is to be gripped, as well as at least one separating device with which a part of the gripped plant to be harvested is to be separated from another part of the plant, wherein the separating device is provided with at least one roller and a cutting mechanism, the roller is movable along the gripped plant over a length of the plant between a starting position and an end position in which the part of the gripped plant to be harvested is to be separated by means of the cutting mechanism from an other part of the plant, and wherein the separating device is configured to convert the direction of travel extending substantially parallel to the land automatically into a movement of the roller substantially directed towards the land from the starting position to the end position.

2. The harvesting machine according to claim 1, wherein through the movement of the harvesting machine in the direction of travel, the roller can be brought into contact with the gripped plant automatically.

3. The harvesting machine according to claim 1, wherein the separating device comprises a hinge construction with which the roller is connected to the harvesting machine.

4. The harvesting machine according to claim 3, wherein the hinge construction comprises a parallelogram linkage.

5. The harvesting machine according to claim 3, wherein the hinge construction is configured to follow the gripped plant in a flexible manner by means of the roller between the starting and end position.

6. The harvesting machine according to claim 1, wherein the separating device is configured to move the roller from the end position to the starting position after separating the part to be harvested.

7. The harvesting machine according to claim 1, wherein the roller comprises a roll in a form of a diabolo which is to be positioned against the plant in order to move the roller along the gripped plant between the starting and the end position.

8. The harvesting machine according to claim 1, wherein a section of the gripping device directly following the in-feed device extends substantially parallel to the land.

9. The harvesting machine according to claim 8, wherein a second section of the gripping device makes an acute angle with the land so that the harvested part of the plant is moved upwards relative to the land, wherein the section directly following the in-feed device is located between the second section and the in-feed device.

10. The harvesting machine according to claim 1, wherein the harvesting machine is provided with different in-feed devices, gripping devices and separating devices mounted next to each other.

11. The harvesting machine according to claim 1, wherein a height of the in-feed device is to be set in such a way that plants with a minimum set height are to be fed into the harvesting machine.

12. A method for harvesting elongated plants, including green asparagus, by a harvesting machine, wherein a plant is fed into the harvesting machine moving in a direction of travel over a land, in the harvesting machine the plant is gripped, and a part of the gripped plant to be harvested is separated from another part of the plant by means of a separating device that is provided with at least one roller and a cutting mechanism, the roller is moved along the gripped plant over a length of the plant between a starting position and an end position in which the part of the gripped plant to be harvested is separated from an other part of the plant by means of the cutting mechanism, and wherein the direction of travel extending substantially parallel to the land is converted automatically into a movement of the roller substantially directed towards the land from the starting position to the end position.

13. The method according to claim 12, wherein, through the movement of the harvesting machine in the direction of travel, the roller is brought into contact with the gripped plant automatically.

14. The method according to claim 12, wherein after separating the part to be harvested, the roller is moved automatically from the end position to the starting position.

15. A harvesting machine for harvesting elongated plants, including a green asparagus, wherein the harvesting machine movable in a direction of travel over a land is provided with at least one in-feed device with which at least one plant is to be fed into the harvesting machine, at least one gripping device following the in-feed device with which the plant fed in is to be gripped, as well as at least one separating device with which a part of the gripped plant to be harvested is to be separated from another part of the plant, wherein the separating device is provided with at least one roller comprising a cutting mechanism, the roller is movable along the gripped plant over a length of the plant between a starting position and an end position in which the part of the gripped plant to be harvested is to be separated by means of the cutting mechanism from an other part of the plant, and wherein the roller comprises a roll in a form of a diabolo which is to be positioned against the plant in order to move the roller along the gripped plant between the starting and the end position.

\* \* \* \* \*